United States Patent Office 3,513,559
Patented May 26, 1970

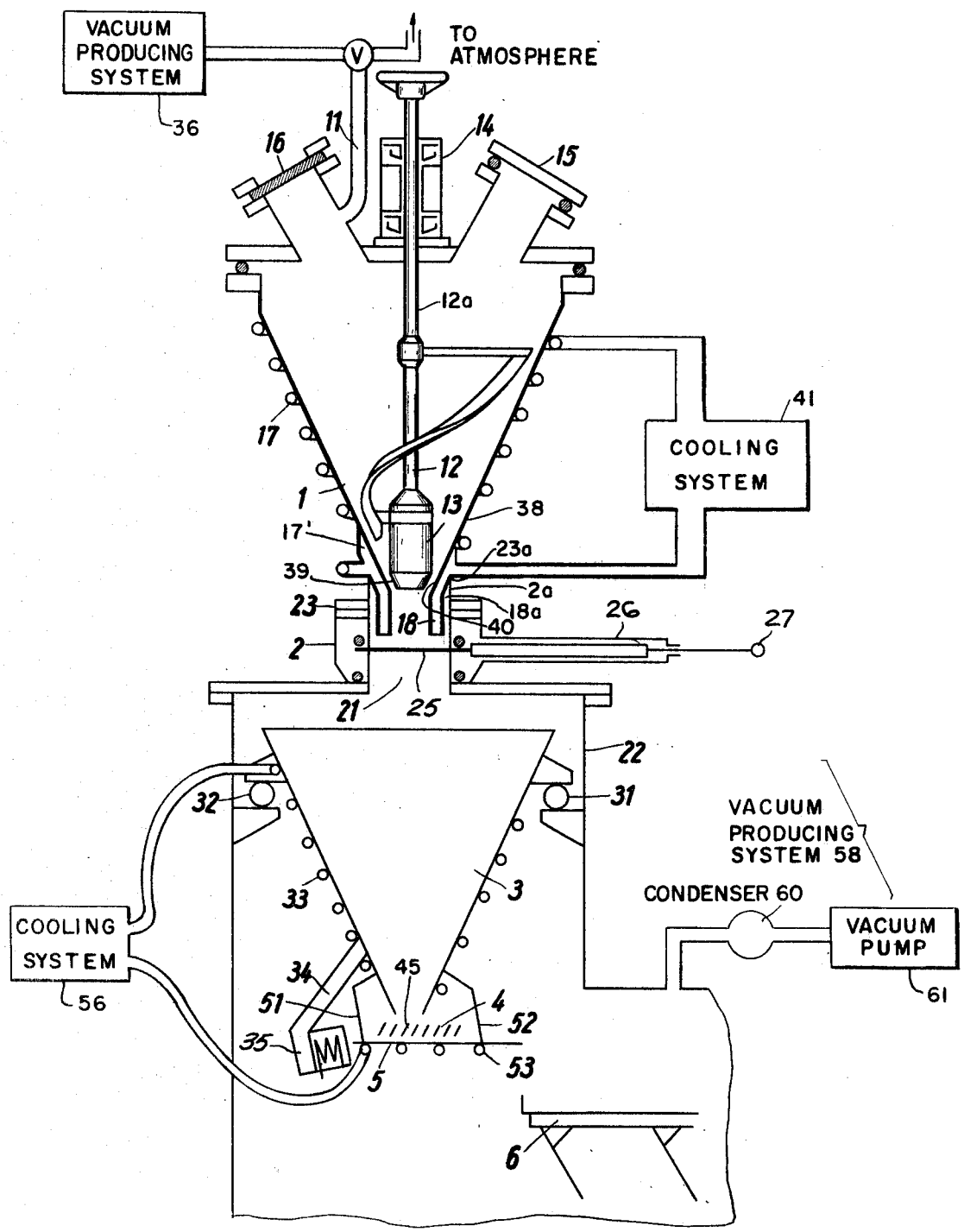

3,513,559
FREEZE-DRYING APPARATUS
Hanns Eilenberg, Rosrath, Germany, assignor to Leybold-Heraeus-Verwaltung GmbH, Cologne-Bayental, Germany
Filed May 9, 1969, Ser. No. 823,424
Claims priority, application Germany, May 11, 1968, 1,778,566
Int. Cl. F26b 5/06
U.S. Cl. 34—5
10 Claims

ABSTRACT OF THE DISCLOSURE

Apparatus for continuous freeze-drying is provided in which a frozen granulate is stored in a funnel-shaped hopper which is cooled and may be evacuated or filled with gas as desired. The material is discharged from the hopper through a cooled discharge opening and a vacuum lock onto a vibratory distributor located within a vacuum drying chamber. A sliding plug in the discharge opening of the hopper, to which is attached a helical stirrer located within the funnel-shaped portion of the hopper, may be vertically moved to adjust the size of the discharge opening and the rate of discharge from the hopper to the vacuum drying chamber.

BACKGROUND OF THE INVENTION

This invention relates to apparatus for continuous freeze-drying, and more particularly to such apparatus in which the material to be dried is fed as a frozen granulate from a funnel-shaped storage hopper which is cooled and can be evacuated or filled with gas and which granulate is passed through a vacuum-tight lock onto a vibratory distributor provided in a vacuum chamber.

Vibratory freeze-drying installations are known in which the material to be dried is introduced into a vacuum chamber containing a grinding mill, the material being first ground and then being directly brought to the vibratory freeze-drying apparatus without further preliminary storage. The construction of such installations is quite complicated since it is difficult to cool the grinding device under a vacuum. Furthermore, very fine particles produced during the grinding are dried too quickly. These may soil the apparatus or have an adverse influence on the quality of the final product.

Other freeze-drying installations are known in which the frozen product is ground into individual particles, and is then brought from a storage container into the vacuum drying apparatus through vacuum lock devices. The vacuum lock devices include cell wheels which permit the passage of too much air into the vacuum chamber and thus make difficult the maintenance of the necessary subatmospheric pressure required for the freeze-drying. The use of cell wheels has the added disadvantage that the product to be brought in is not filled in a continuous flow, but rather in interrupted thrusts.

Consequently, it is difficult to supply the continuous freeze-drying apparatus with material at a proper rate to permit full utilization of its drying capability.

SUMMARY OF THE INVENTION

Among the objects of the present invention is the provision of an apparatus in which frozen granulate may be brought into the vibratory freeze-drying installation in sufficient quantity so that the full capacity of the drying assembly may be fully utilized.

Briefly stated, this and other objects of the invention are achieved by the provision of a vertically displaceable helical stirring mechanism in a funnel-shaped storage hopper, which stirring mechanism has a sealing plug fixed to it whose position within a discharge opening in the storage hopper can be adjusted to vary the discharge opening cross section. In addition, the discharge opening of the storage hopper is cooled by a cooling element which surrounds it. The cooled discharge opening extends into the upper portion of the vacuum lock without a heat-conducting connection.

Raising or lowering the sealing plug regulates the amount of granulate which flows from the storage hopper into the vibratory freeze-drying apparatus. The cooling of the discharge opening and the fact that there is no heat-conducting connection between this opening and the vacuum lock prevents heat transfer from the vacuum lock to the discharge opening of the storage hopper. Even in small quantities such heat transfer could partially thaw the frozen granulate and cause an undesirable agglomeration of the individual granules. When the vacuum lock is closed, it is possible to vent the storage hopper for the purpose of adding further quantities of granulate without influencing the subatmospheric pressure in the drying chamber. Accordingly, continuous feeding of the drying chamber is possible.

BRIEF DESCRIPTION OF THE DRAWINGS

The sole figure is a schematic representation of one embodiment of the present invention.

DESCRIPTION OF THE PREFERRED EMBODIMENTS

Referring to the sole drawing figure, a freeze-drying installation according to the present invention includes a cooled storage hopper 1 from which frozen granulate is fed through a vacuum lock 2 into a cooled dosage hopper 3 located within a vacuum drying chamber 22. A shear grate 4 position above a vibratory distributor 5 is located just below the outlet of dosage hopper 3. The vibratory distributor 5 distributes the frozen granulate onto a vibratory drying bed 6.

At the upper end of storage hopper 1 there is located a connection 11 which may be connected selectively to a vacuum-producing system 36 or a source of gas such as the atmosphere through a valve V.

A helical stirring mechanism 12 having a sealing plug 13 formed at its lower end is mounted within the lower portion 38 of the storage hopper, which is funnel-shaped. Sealing plug 13 is formed of the same material as the storrer 12, e.g. iron or aluminum, but the outer surface is covered with a synthetic material which is a poor conductor of heat and has a low coefficient of friction, e.g. Teflon. It has a beveled portion 39 at its lower end whose surfaces are generally parallel to the bottom of the funnel-shaped discharge opening 40 of the storage hopper.

A vacuum tight passage 14 is provided at the top of the storage hopper 1 for permitting raising and lowering the helical stirring mechanism 12 and the sealing plug 13 by sliding shaft 12a vertically in passage 14.

Vacuum tight openings 15 and 16 are provided in the upper portion of the storage hopper, and opening 16 is closed by a transparent section through which the interior of the storage hopper may be observed. Opening 15 may be selectively opened and closed to fill the interior of the storage hopper with the frozen granulated material.

A helical cooling coil 17 is disposed about the outer periphery of the storage hopper and the discharge opening 40.

The cooling coil 17 is connected to a cooling system 41 which supplies a cooling medium thereto. The lower portion of the discharge opening is surrounded on all sides by the cooling coil portion 17′ which is in the form of an annular chamber. The storage hopper 1 includes a connecting portion 18 which extends into the upper portion of the vacuum lock 2 without there being any heat-conductive connection to the vacuum lock since the walls of portion 18 are spaced from the walls of the vacuum lock by a space 18a in which there is a vacuum. For this reason, it is not necessary to cool vacuum lock 2 which would otherwise be necessary to maintain the granulate frozen.

The vacuum lock 2 is disposed in an opening 21 of the vacuum drying chamber 22. The storage hopper 1 is connected with the vacuum lock 2 through a flange connection 23. The vertical walls 2a of vacuum lock 2 are conected to the bottom of hopper 1 at a point of line contact 23a so that the connection between lock 2 and hopper 1 will not be heat-conductive.

The vacuum lock 2 as shown schematically in the drawing includes a slide member 25 mounted in a support structure 26, and having a handle 27. Slide member 25 is mounted for movement from a position in which it closes the discharge opening 21 between hopper 1 and vacuum chamber 22 in an air-tight fashion to an open position in which passage between the hopper and the chamber is possible.

Within the interior of vacuum chamber 22 a dosage hopper 3 is disposed below the opening of the vacuum lock 2. It is mounted on supports 31 and 32 which permit relative movement between the dosage hopper 3 and the drying chamber walls. An electromagnetic drive system 34 is provided which moves the dosage hopper 3 in a vibratory movement designed to shake out the granulate through its discharge opening 45. The vibratory distributor 5 is connected with the hopper 3 via the moving means 51, 52, which may be in the form of leaf springs. Hopper 3 is caused to vibrate by the vibratory drive 35. This movement is transmitted to the distributor via 51, 52. The shear grate 4 has no special drive, but may be driven together with the vibratory distributor 5 via 51, 52. The shear grate 4 has its lower portion spaced above the vibratory distributor 5 by a distance which is generally equal to that of the average size of the granulates supplied to the dosaging hopper. The material is moved from the vibratory distributor 5 to the drying bed 6.

A cooling coil 33 of helical shape is disposed about the outer periphery of the dosaging hopper 3, and another cooling system cooling coil 53 is disposed adjacent to the vibratory distributor mechanism 5. Both cooling coils are connected to a cooling system 56.

A vacuum-producing system 58 including a surface condenser 61 and a vacuum pump 61, both of conventional size, is connected to the vacuum chamber 22 for maintaining a vacuum therein.

OPERATION OF THE PREFERRED EMBODIMENTS

The material to be dried is supplied in the form of frozen granulates through the opening 15 into the storage hopper 1. Previously, the storage hopper will have been sealed off from the dosaging hopper 3 by closing the vacuum lock 2 by moving slide 25 to the closed position and vented by appropriate manipulation of the two-way valve. After the storage hopper 1 is filled, the opening 15 is locked to make the hopper airtight. Valve V is then turned to connect the storage hopper 1 to the vacuum-producing system 36 and the storage hopper is evacuated to the same subatmospheric pressure as exists in the vacuum drying chamber 22. For example, if coffee is being treated, the pressure will be reduced to about $500\mu$ although this pressure may be different for other products. While hopper 1 is being filled, shaft 12a is slowly rotated to stir the granulate. Stirring is continued as the granulate falls into the hopper 3.

The vacuum lock 2 is then opened and the helical stirring mechanism 12 is vertically displaced, and the sealing plug 13 is moved to open discharge opening 40 to the desired size. Although the sealing plug 13 is shown as being large enough to seal the opening, it can also be smaller than the opening if desired. The granulate then passes in a continuous flow from the storage hopper 1 to the dosaging hopper 3. Preferably, the passage opening is set to a size such that a larger amount is fed into the dosaging hopper than is discharged at its outlet 45. The dosaging hopper 3 is continuously moved by drive mechanism 34 and the material passes through the shear grate 4 and over the vibratory distributor 5. At the same time, the moving means 51, 52 for the vibratory distributor 5 is in operation, moving it in a direction opposite that of the dosaging hopper 3. The vibratory distributor 5 spreads the material onto the drying beds 6.

The material in the storage hopper 1 is continuously maintained at a desired temperature by the cooling coil 17. The material which is located within the dosage hopper 3, or is being distributed by the vibratory distributing mechanism 5, is maintained at a desired temperature by the cooling coils 33 and 53. The surface temperature of the dosaging hopper and the vibratory distributor are maintained at a temperature approximately 5° C. higher than that of the surface of the condenser 60. This prevents the cooled dosaging hopper and the vibratory distributor, due to their arrangement in the vacuum drying chamber, from inadvertently acting as condensers for the water vapor evaporating from the material being dried during the drying process.

It will be understood that the above description of the present invention is susceptible to various modifications, changes and adaptations.

I claim:

1. Apparatus for continuous freeze-drying comprising, in combination:
    (a) storage hopper means for storing frozen granulated material having a vertically arranged funnel-shaped portion and a discharge opening;
    (b) vacuum-producing means connected to the storage hopper means for producing a subatmospheric pressure within the storage hopper;
    (c) means for venting the interior of the storage hopper;
    (d) helical stirring means mounted in said funnel-shaped portion of the storage hopper;
    (e) sealing plug means connected to the helical stirring means and mounted in said discharge opening;
    (f) means for moving said sealing plug means relative to the wall of the discharge opening to thereby vary the opening size;
    (g) vacuum lock means connected to said discharge opening for passing frozen granulated material from said storage hopper means;
    (h) vacuum drying chamber means connected to the vacuum lock means for receiving frozen graulated material from said discharge opening;
    (i) vibratory distributor means disposed in said chamber means for conveying said granulated material within the chamber means; and
    (j) cooling means surrounding said discharge opening and extending into the upper part of said vacuum lock means in a manner which maintains heat exchange at a minimum.

2. The combination defined in claim 1 wherein said sealing plug moving means is arranged to also vertically displace said helical stirring means relative to the funnel-shaped portion.

3. The combination defined in claim 2 wherein said sealing plug means has a surface formed of a material having a low coefficient of friction and good heat-insulating properties.

4. The combination defined in claim 3 wherein said sealing plug surface is formed of a layer of a synthetic material.

5. The combination defined in claim 1 including:
    (k) funnel-shaped dosage hopper means located within said vacuum chamber below said vacuum lock for receiving a supply of frozen granulated material to be freeze-dried, said vibratory distributor means being located beneath said dosage hopper means;

(l) cooling system means for cooling said funnel-shaped dosage hopper means and said vibratory distributor means;

(m) shear grate means disposed between the outlet of said dosage hopper means and the vibratory distributor; and (n) means for simultaneously moving the vibratory distributor means and the dosaging hopper means in opposite directions.

6. The combination defined in claim 5 including means connecting the shear grate means and the vibratory distributor means.

7. The combination defined in claim 5 wherein said vibratory distributor means is spaced from the shear grate by a distance substantially equal to that of the grain size of the frozen granulated material.

8. The combination defined in claim 5 including means for producing a vacuum within said vacuum chamber, said vacuum-producing means including a surface condenser.

9. A method of continuous freeze-drying involving the steps of:

(a) supplying material to be freeze-dried to a storage hopper connected to a vacuum drying chamber by a vacuum lock while said vacuum lock is closed;

(b) sealing the storage hopper so as to make it airtight;

(c) reducing the pressure within the storage hopper to a subatmospheric pressure substantially equal to that within the vacuum drying chamber;

(d) opening the vacuum lock between the storage chamber and the drying chamber;

(e) opening a discharge opening which extends into the vacuum lock for passage of the storage material from the storage chamber into the vacuum chamber and adjusting the opening to a size selected to pass the material continuously into the chamber at a desired rate;

(f) cooling the opening between the storage hopper and the vacuum chamber to maintain the material within the storage chamber at a temperature such that the frozen granulate will not agglomerate;

(g) receiving the material discharged from the storage hopper in a dosaging hopper maintained in the vacuum drying chamber;

(h) distributing the material held within the dosaging hopper with a vibratory distributor onto drying beds located within the drying chamber; and (i) maintaining the vacuum within the drying chamber with a vacuum-producing system including a surface condenser, and maintaining the temperature of the dosaging hopper and the vibratory distributor at a temperature which is higher than that of the surface of the condenser.

10. The method of claim 9 including the step of maintaining the temperature of said dosaging hopper and of the vibratory distributor at 5° C. above that of the surface of the condenser.

References Cited

UNITED STATES PATENTS

| | | | |
|---|---|---|---|
| 2,751,687 | 6/1956 | Colton | 34—5 |
| 3,264,747 | 8/1966 | Fuenterilla | 34—5 |
| 3,293,766 | 12/1966 | Togashi | 34—5 |
| 3,324,565 | 6/1967 | Smith | 34—5 |
| 3,445,247 | 5/1969 | Baerwald | 34—5 |

WILLIAM J. WYE, Primary Examiner

U.S. Cl. X.R.

34—92